(12) United States Patent
Ishida

(10) Patent No.: US 12,721,464 B2
(45) Date of Patent: Sep. 1, 2026

(54) ELECTRIC KETTLE

(71) Applicant: KALITA CO., LTD., Kanagawa (JP)

(72) Inventor: Ichiro Ishida, Kanagawa (JP)

(73) Assignee: KALITA CO., LTD., Kanagawa (JP)

( * ) Notice: Subject to any disclaimer, the term of this patent is extended or adjusted under 35 U.S.C. 154(b) by 831 days.

(21) Appl. No.: 18/102,463

(22) Filed: Jan. 27, 2023

(65) Prior Publication Data

US 2023/0172385 A1 Jun. 8, 2023

Related U.S. Application Data

(63) Continuation of application No. PCT/JP2021/023695, filed on Jun. 23, 2021.

(30) Foreign Application Priority Data

Jul. 30, 2020 (JP) ................................ 2020-129317

(51) Int. Cl.
*A47J 27/21* (2006.01)

(52) U.S. Cl.
CPC ... *A47J 27/21008* (2013.01); *A47J 27/21175* (2013.01)

(58) Field of Classification Search
CPC ........... A47J 27/21008; A47J 27/21166; A47J 27/2105; A47J 27/21175; A47J 31/303; A47J 31/306; A47J 27/21183
USPC ...................... 99/275, 279–323.3, 403–418; 219/385–474, 725–735; 122/13.01–19.2; 426/425–435, 474–476, 506–511
See application file for complete search history.

(56) References Cited

U.S. PATENT DOCUMENTS 3,487,200 A * 12/1969 Laama .............. A47J 27/21166 D7/319
3,832,526 A * 8/1974 Clausse ............. A47J 27/21166 219/441

(Continued)

FOREIGN PATENT DOCUMENTS

CN 205649357 U 10/2016
JP 2010-131234 A 6/2010

(Continued)

OTHER PUBLICATIONS

International Search Report issued in PCT/JP2021/023695 mailed on Aug. 17, 2021 with English Translation (6 pages).

(Continued)

*Primary Examiner* — Edward F Landrum
(74) *Attorney, Agent, or Firm* — Nakanishi IP Associates, LLC

(57) ABSTRACT

A lid body of an electric kettle has a first inlet port, a second inlet port, and a discharge port, and a first channel and a second channel provided in the lid body for guiding the steam introduced through the first inlet port and the second inlet port to the discharge port, respectively. The first inlet port and the second inlet port are disposed on opposite, left and right, sides of a front-rear centerline of the lid body. The first channel extends from the first inlet port to the side of the second inlet port beyond the front-rear centerline and is folded back on the side of the second inlet port. The second channel extends from the second inlet port to the side of the first inlet port beyond the front-rear centerline and is folded back on the side of the first inlet port.

6 Claims, 12 Drawing Sheets

(56) References Cited

U.S. PATENT DOCUMENTS

| | | | | |
|---|---|---|---|---|
| 2007/0131121 | A1* | 6/2007 | Pepper | A47J 31/005 99/279 |
| 2007/0169629 | A1* | 7/2007 | Shao | A47J 31/303 99/275 |
| 2010/0270284 | A1* | 10/2010 | Cohen | A47J 27/21175 219/507 |
| 2012/0091117 | A1* | 4/2012 | Cheng | A47J 27/2105 219/385 |
| 2014/0246428 | A1* | 9/2014 | Bodum | A47J 41/0055 220/62.11 |
| 2016/0374500 | A1* | 12/2016 | Bugatti | A47J 27/21141 219/435 |
| 2021/0204746 | A1 | 7/2021 | Katsunuma | |

FOREIGN PATENT DOCUMENTS

| | | | |
|---|---|---|---|
| JP | 2012-245138 | A | 12/2012 |
| JP | 2013-236663 | A | 11/2013 |
| JP | 2014-505567 | A | 3/2014 |
| JP | 2020-048721 | A | 4/2020 |
| WO | 2011/101642 | A2 | 8/2011 |
| WO | 2012/110825 | A2 | 8/2012 |

OTHER PUBLICATIONS

Written Opinion of International Searching Authority issued in PCT/JP2021/023695 mailed on Aug. 17, 2021 with English Translation (7 pages).

* cited by examiner 40
53
90
120
98
54
50
59
60
P

ELECTRIC KETTLE

FIELD

Embodiments described herein relate generally to an electric kettle.

BACKGROUND

Electric kettles are well known, which are used in dining rooms, kitchens or other areas of households (see Patent Literature 1, for example). The electric kettle includes a power base and a kettle main body, the power base is a pedestal shaped to be suitably mounted on a table or the like, and the kettle main body is removably attached to the power base. The kettle main body has a container for containing water (hot water), a nozzle attached to a lower part of the container, and a handle provided on the opposite side of the container to the nozzle. The container has an opening in the top part, to which an openable lid body is attached. When the kettle main body is mounted on the power base, a heater in the container is driven by electric power supplied from the power base and can boil the water in the container.

With such an electric kettle, a steam channel for discharging steam produced in the container to the outside is formed in the lid body, in order to reduce the pressure in the container raised when the water is boiling or in order to prevent the water (hot water) from being hard to pour from the nozzle because of the negative pressure in the kettle (see Patent Literature 2, for example). Furthermore, the steam channel is shaped to be bent in the lid body, in order to prevent a large amount of water (hot water) from leaking when the kettle main body falls on its side.

CITATION LIST

Patent Literature

Patent Literature 1: Japanese Translation of PCT International Application Publication No. 2014-505567

Patent Literature 2: Japanese Patent Laid-Open No. 2010-131234

SUMMARY OF INVENTION

Technical Problem

The electric kettle described above has the following problems. When there is only one steam channel, the pressure in the kettle may be unable to be sufficiently released while the water is boiling, and the hot water in the kettle may be ejected from the steam channel. On the other hand, if the inner diameter of the steam channel is increased in order to ensure a sufficient flow channel for steam, the thickness of the lid body increases, and a large amount of water (hot water) in the kettle may leak from the steam channel when the kettle falls on its side, although it ensures that the pressure in the kettle is released while the water is boiling. Alternatively, an additional pressure release hole may be provided in the kettle side face or lid body in order to ensure that the pressure in the container is released while the water is boiling. However, when the kettle falls on its side, the water (hot water) may leak from the pressure release hole.

An object of the present invention is to provide an electric kettle that can release the pressure in the electric kettle while the water is boiling and can minimize the amount of water (hot water) that leaks from a steam channel when the electric kettle falls on its side.

Solution to Problem

In an electric kettle according to an embodiment, a lid body having a plate-like shape that covers an opening of a top part of a container has a first inlet port and a second inlet port that are formed in a back side of the lid body for introducing steam generated from hot water stored in the container into the lid body, a discharge port formed in a front side of the lid body for discharging the steam introduced into the lid body to an outside of the lid body, a first channel provided in the lid body for guiding the steam introduced through the first inlet port to the discharge port, and a second channel provided in the lid body for guiding the steam introduced through the second inlet port to the discharge port. The first inlet port and the second inlet port are disposed on opposite, left and right, sides of a front-rear centerline of the lid body. The first channel extends from the first inlet port to the side of the second inlet port beyond the front-rear centerline and is folded back on the side of the second inlet port. The second channel extends from the second inlet port to the side of the first inlet port beyond the front-rear centerline and is folded back on the side of the first inlet port.

Advantageous Effects of Invention

According to the present invention, since two steam channels are provided, the pressure in the electric kettle can be released with reliability when the water is boiling, and the amount of water (hot water) leaking from the steam channels can be minimized when the electric kettle falls on its side.

DETAILED DESCRIPTION

Figure 1:
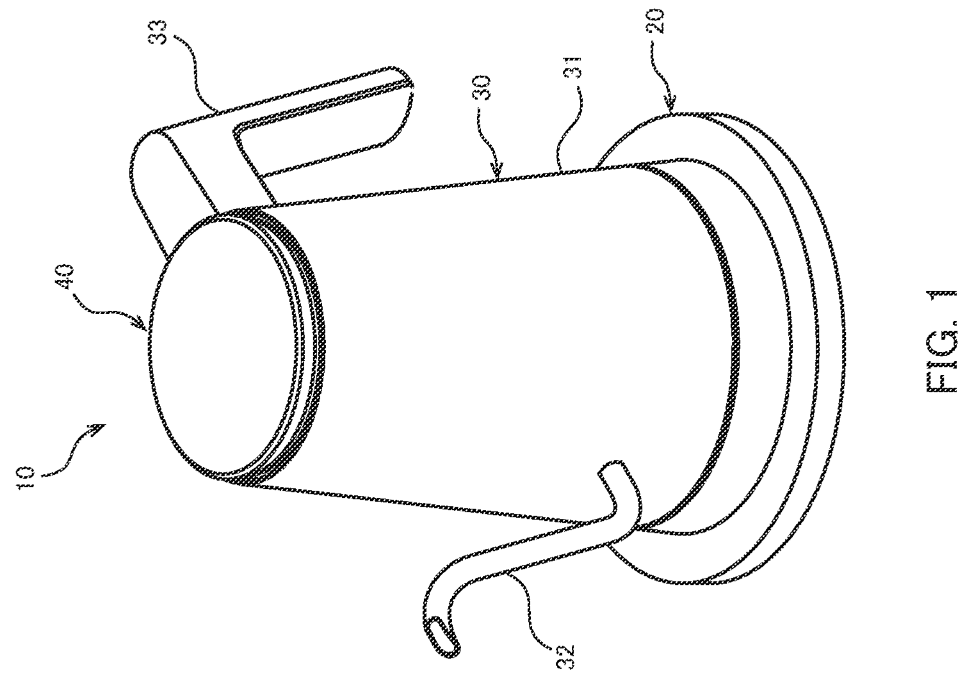
FIG. 1 is a perspective view showing a general appearance of an electric kettle according to an embodiment of the present invention.

In the following, an electric kettle according to an embodiment will be described with reference to FIGS. 1 to

12. In the drawings, reference symbols Sa and Sb denote a direction of a flow of steam, and reference symbol L denotes a water level of water (hot water). In these drawings, an alternate long and short dash line P denotes a front-rear centerline of a lid body.

As shown in FIG. 1, an electric kettle 10 includes a power base 20 to be placed on a table or the like and a kettle main body (hot water storage container) 30 to be removably attached to the power base 20. The kettle main body 30 includes a container 31 that has an opening in the top part. A base end of a nozzle 32 is provided in a front lower part of the container 31. A tip end part of the nozzle 32 extends upward. A handle 33 is provided at the rear of the container 31 (on the opposite side to the base end of the nozzle 32). To the top part of the container 31, a lid body 40 that covers the opening of the top part of the container 31 is attached in an openable manner. Typically, the container 31 has a generally cylindrical trapezoidal shape that tapers toward the top. The lid body 40 has the shape of a circular plate that matches with the opening of the top part of the container 31. To set the center of gravity of the kettle main body 30 further rearward than the central axis of the container 31, the handle 33 has a greater weight than the nozzle 32. Of course, a weight or the like may be provided at the rear part of the container 31, for example, as far as the center of gravity of the kettle main body 30 can be set further rearward than the central axis of the container 31. The general shape of the container 31 is not limited to the cylindrical trapezoidal shape and may be a cylindrical shape, for example.

The lid body 40 is provided with a mechanism for discharging steam produced in the container 31 to the outside. An inlet port for introducing steam into the lid body 40 is provided on the back side of the lid body 40. A discharge port for discharging the steam introduced into the lid body 40 to the outside is provided on the front side of the lid body 40.

Figure 2:
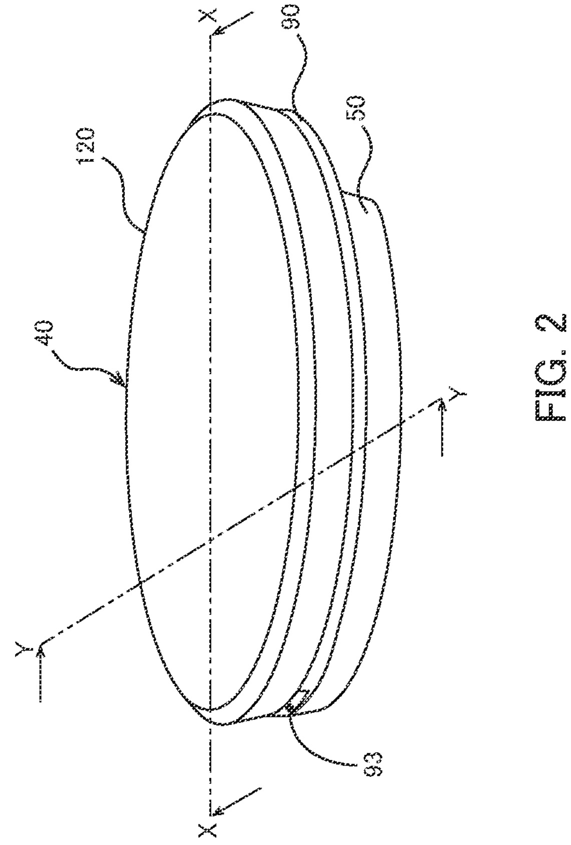
FIG. 2 is a perspective view of a lid body of the electric kettle shown in FIG. 1.
Figure 3:
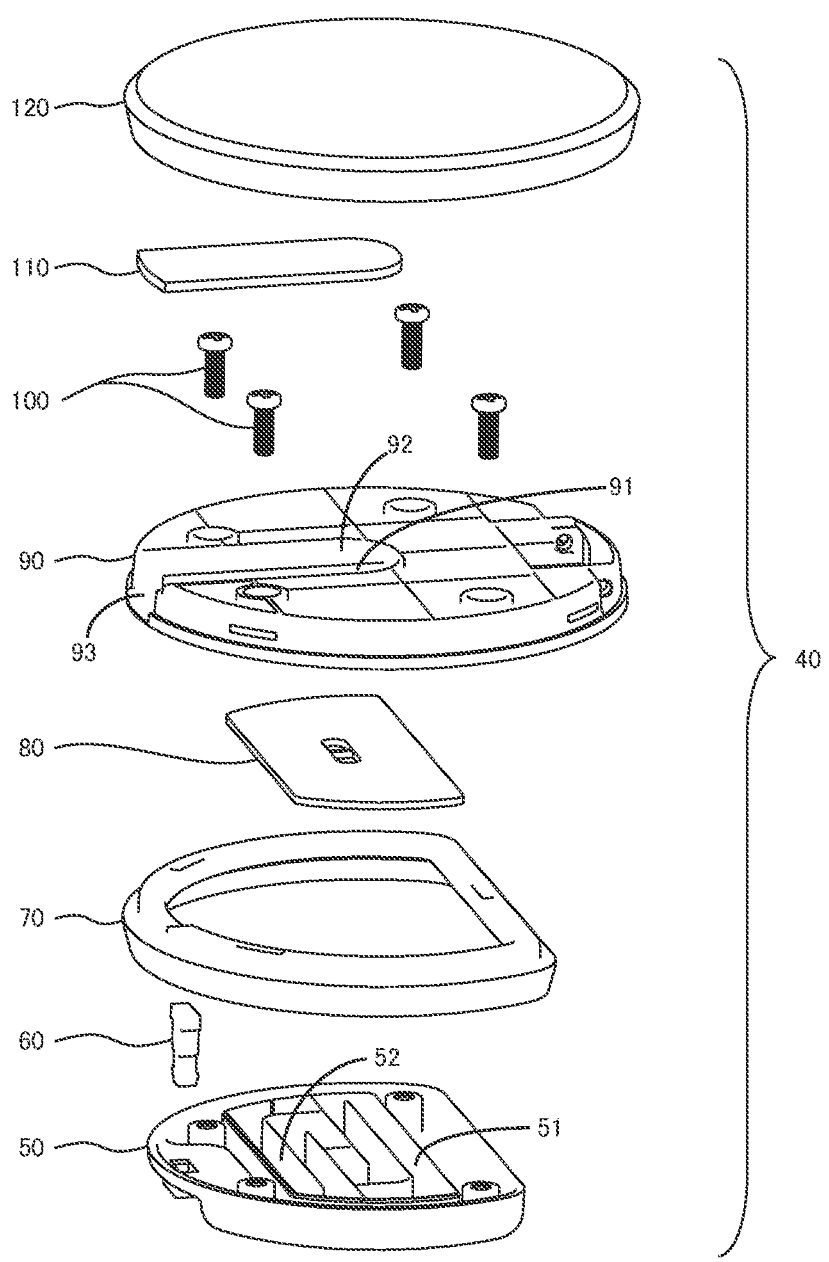
FIG. 3 is a perspective exploded view of the lid body shown in FIG. 2.

Specifically, as shown in FIGS. 2 and 3, the lid body 40 is formed by a plurality of components stacked on one another. In this embodiment, the lid body 40 includes an inner lid (lower layer-side member) 50 located at a bottom layer, a middle lid (upper layer-side member) 90 located at an intermediate layer, and an outer lid 120 as decorative plate located at a top layer.

A first inlet port 53 and a second inlet port 54 for introducing the steam in the container 31 into the lid body 40 are provided on a bottom face of the inner lid 50. A discharge port 93 for discharging the steam introduced into the lid body 40 to the outside is provided on a side face of the middle lid 90. A first channel that connects the first inlet port 53 provided on the inner lid 50 and the discharge port 93 provided on the middle lid 90 to each other is provided in both the inner lid 50 and the middle lid 90. Similarly, a second channel that connects the second inlet port 54 provided on the inner lid 50 and the discharge port 93 provided on the middle lid 90 to each other is provided in both the inner lid 50 and the middle lid 90.

In the following, a part of the first channel provided in the inner lid 50 and a part of the first channel provided in the middle lid 90 are referred to as a first lower channel 51 and a first upper channel 91, respectively, for differentiation. Similarly, a part of the second channel provided in the inner lid 50 and a part of the second channel provided in the middle lid 90 are referred to as a second lower channel 52 and a second upper channel 92, respectively, for differentiation.

In addition to the components described above, the lid body 40 has a lock member 60 that is attached to the inner lid 50 and is to be engaged with the container 31. The lid body 40 has a rubber packing 70 that covers the circumference of the inner lid 50 and prevents steam or water from leaking through a gap between the lid body 40 and the opening of the top part of the container 31. The lid body 40 has a first sealing plate 80 made of elastic resin that is disposed between the inner lid 50 and the middle lid 90 and covers top openings of the first lower channel 51 and the second lower channel 52. The lid body 40 has a second sealing plate 110 made of elastic resin that is disposed between the middle lid 90 and the outer lid 120 and covers top openings of the first upper channel 91 and the second upper channel 92. The middle lid 90 and the inner lid 50 are fastened by a bolt 100 with the first sealing plate 80 interposed therebetween.

For simplicity of description, an up-down direction (thickness direction), a front-rear direction (length direction) and a left-right direction (width direction) of the lid body 40 are defined as follows. The direction in which the inner lid 50, the middle lid 90 and the outer lid 120 forming the lid body 40 are stacked one on another is the up-down direction (thickness direction) of the lid body 40. The side of the inner lid 50 is the down side of the lid body 40, and the side of the outer lid 120 of the lid body 40 is the up side of the lid body 40. The front-rear centerline of the lid body 40 is a line connecting the front end and the rear end of the lid body 40. When viewed in plan view, the front end of the lid body 40 corresponds to the position of the base end of the nozzle 32 of the container 31 when the opening of the top part of the container 31 is lidded. The rear end of the lid body 40 corresponds to the position at which the base end of the handle 33 is attached to the container 31 when the opening of the top part of the container 31 is lidded. The direction that is parallel to the front-rear centerline is the front-rear direction (length direction) of the lid body 40. The side on which the nozzle 32 of the container 31 is provided is the front side of the lid body 40, and the side on which the handle 33 is provided is the rear side of the lid body 40. The direction perpendicular to the front-rear direction and the up-down direction of the lid body 40 is the left-right direction (width direction) of the lid body 40.

Components of the lid body 40 will be described with reference to FIGS. 4 to 9.

Figure 4:
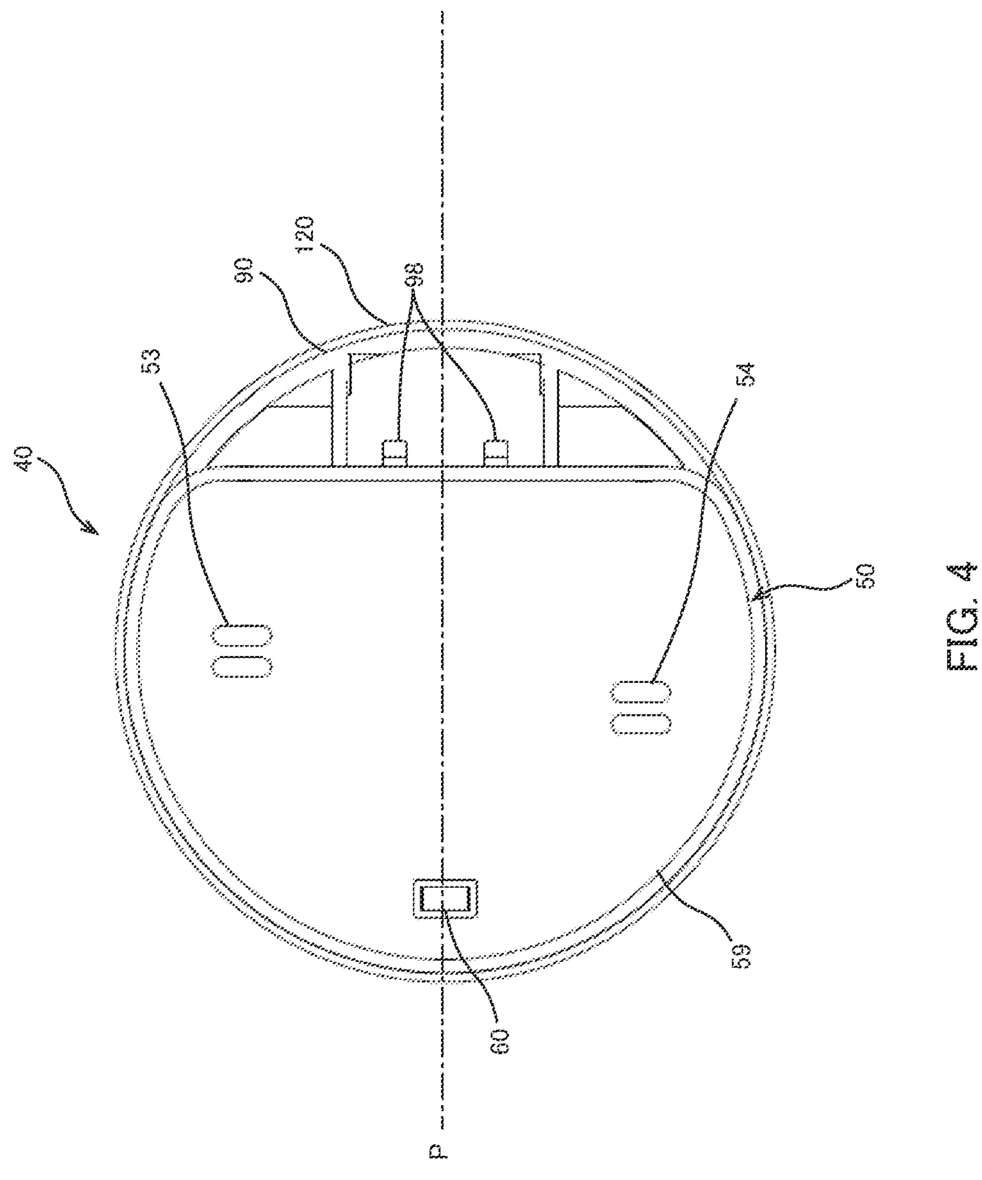
FIG. 4 is a bottom view of the lid body shown in FIG. 2.
Figure 5:
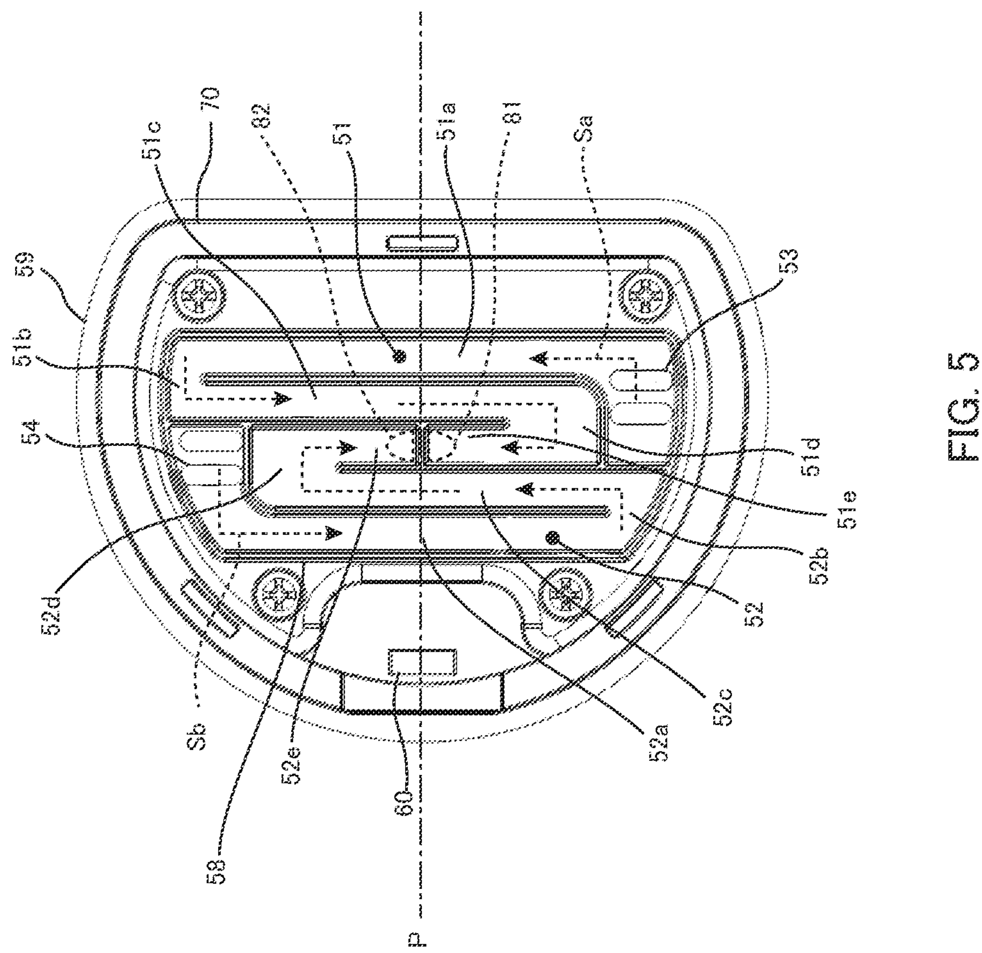
FIG. 5 is a top view of an inner lid shown in FIG. 3.

As shown in FIGS. 4 and 5, the inner lid 50 includes an inner lid main body 59 that has a pan-like shape and is open at the top. The first inlet port 53 and the second inlet port 54 are formed in a bottom plate of the inner lid main body 59 that corresponds to the back side of the lid body 40. Typically, the first inlet port 53 and the second inlet port 54 are formed at positions that are close to the center of the lid body 40 in the length (front-rear) direction and close to left and right outer edges on the opposite sides of the front-rear centerline P.

Figure 8:
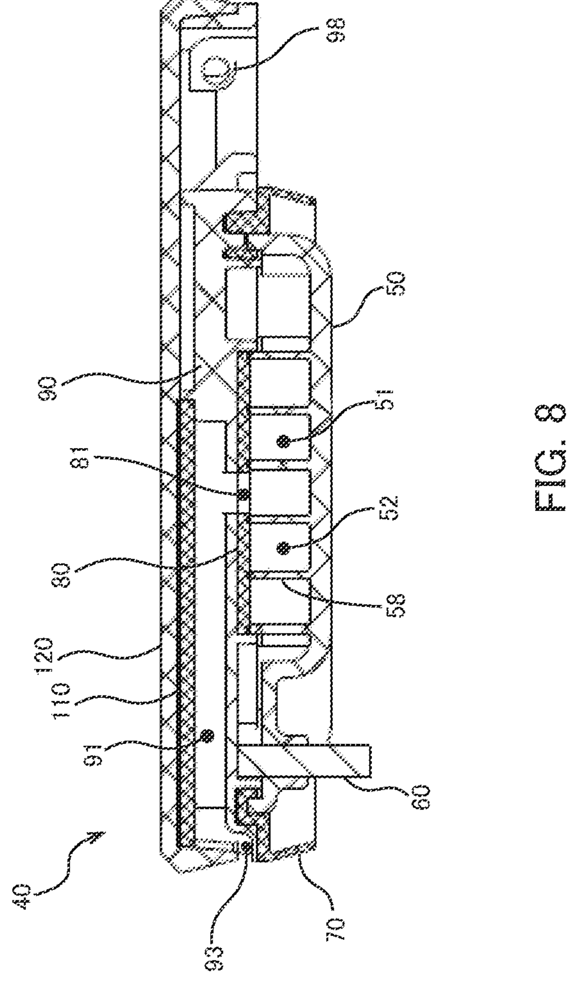
FIG. 8 is a cross-sectional view taken along the line X-X in FIG. 2.
Figure 9:
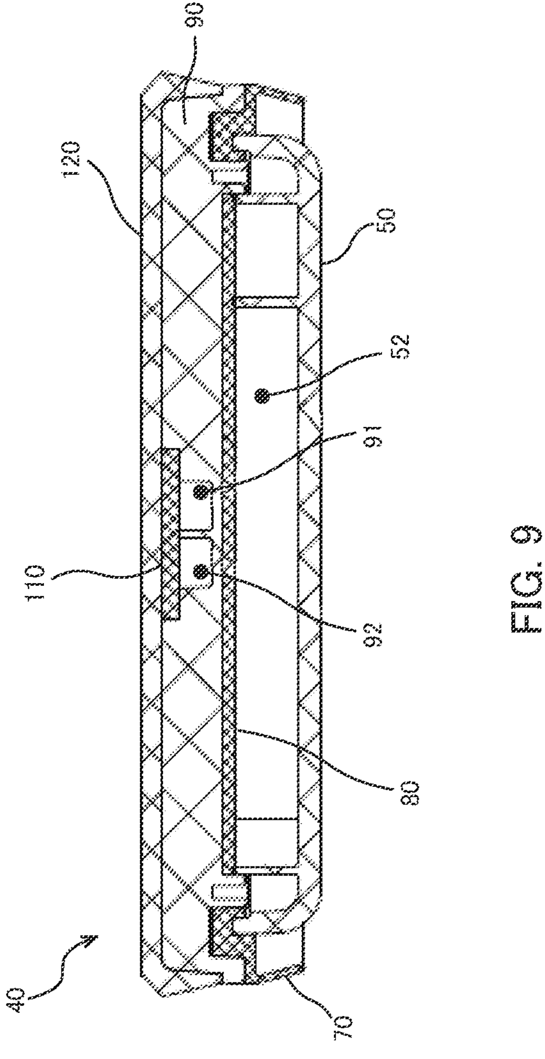
FIG. 9 is a cross-sectional view taken along the line Y-Y in FIG. 2.

As shown in FIG. 5, the first lower channel 51 and the second lower channel 52 that are independent from each other are formed in an upper face of the inner lid main body 59. As shown in FIGS. 8 and 9, the first lower channel 51 and the second lower channel 52 are defined by the bottom plate of the inner lid main body 59, a partition plate 58 vertically provided on the upper face of the inner lid main body 59, and the first sealing plate 80 stacked on the inner lid 50.

The first lower channel 51 is formed toward the rear of the inner lid main body 59. One end of the first lower channel 51 is connected to the first inlet port 53, and the other end of the first lower channel 51 is connected to the first upper channel 91. The first lower channel 51 is folded back twice on the opposite sides of the front-rear centerline P. More specifically, the first lower channel 51 has a first channel part 51*a* that extends from the first inlet port 53 toward the opposite side of the front-rear centerline P (toward the side of the second inlet port 54). An end part of the first channel part 51*a* is connected to a first bent part 51*b* that is folded back toward the inner side in a U-shape. An end part of the first bent part 51*b* is connected to a second channel part 51*c* that extends toward the side of the first inlet port 53 on the opposite side of the front-rear centerline P. An end part of the second channel part 51*c* is connected to a second bent part 51*d* that is folded back toward the inner side in a U-shape. An end part of the second bent part 51*d* is connected to a third channel part 51*e* that extends to the center of the lid body 40 in the width direction. The third channel part 51*e* is in communication with the first upper channel 91 through a first passage port 81.

Typically, the first channel part 51*a*, the second channel part 51*c*, and the third channel part 51*e* have a straight shape and extend in parallel to the left-right direction of the lid body 40. In the left-right direction of the lid body 40, the position of the bend of the first bent part 51*b* is located closer to the outer edge than the position of the innermost part of the second inlet port 54.

The second lower channel 52 is formed toward the front of the inner lid main body 59. One end of the second lower channel 52 is connected to the second inlet port 54, and the other end of the second lower channel 52 is connected to the second upper channel 92. The second lower channel 52 is folded back twice on the opposite sides of the front-rear centerline P. More specifically, the second lower channel 52 has a first channel part 52*a* that extends from the second inlet port 54 toward the opposite side of the front-rear centerline P (toward the side of the first inlet port 53). An end part of the first channel part 52*a* is connected to a first bent part 52*b* that is folded back toward the inner side in a U-shape. An end part of the first bent part 52*b* is connected to a second channel part 52*c* that extends toward the side of the second inlet port 54 on the opposite side of the front-rear centerline P. An end part of the second channel part 52*c* is connected to a second bent part 52*d* that is folded back toward the inner side in a U-shape. An end part of the second bent part 52*d* is connected to a third channel part 52*e* that extends to the center of the lid body 40 in the width direction. The third channel part 52*e* is in communication with the second upper channel 92 through a second passage port 82.

Typically, the first channel part 52*a*, the second channel part 52*c*, and the third channel part 52*e* have a straight shape and extend in parallel to the left-right direction of the lid body 40. In the left-right direction of the lid body 40, the position of the bend of the first bent part 52*b* is located closer to the outer edge than the position of the innermost part of the first inlet port 53.

Figure 6:
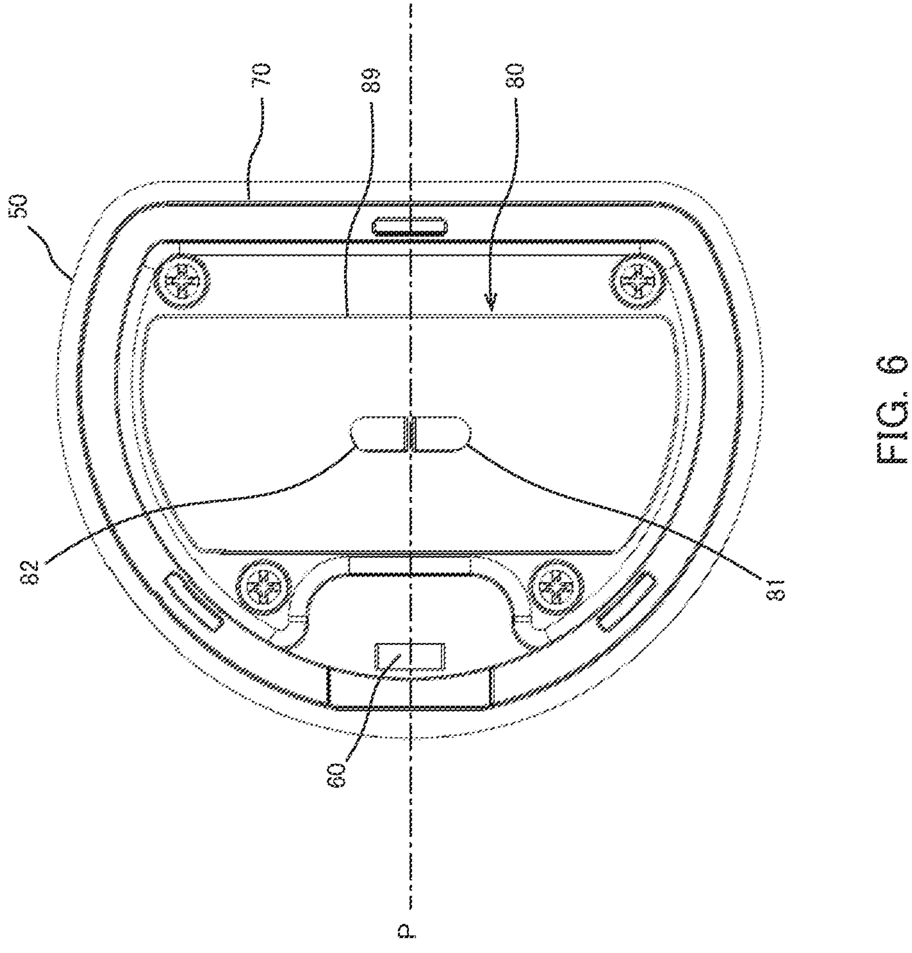
FIG. 6 is a top view of a first sealing plate shown in FIG. 3.

As shown in FIG. 6, the first sealing plate 80 includes a first plate body 89 having a size enough to cover the top openings of the first lower channel 51 and the second lower channel 52. The first passage port 81 and the second passage port 82, through which steam having passed through the first lower channel 51 and the second lower channel 52 flows to the middle lid 90, are formed in the first plate body 89 at central positions thereof. The first passage port 81 is provided at a position corresponding to the end of the third channel part 51*e* of the first lower channel 51. The second passage port 82 is provided at a position corresponding to the end of the third channel part 52*e* of the second lower channel 52. Since the first passage port 81 and the second passage port 82 are formed close to each other at the center of the lid body 40, the first upper channel 91 and the second upper channel 92 can be more easily formed in the middle lid 90.

Figure 7:
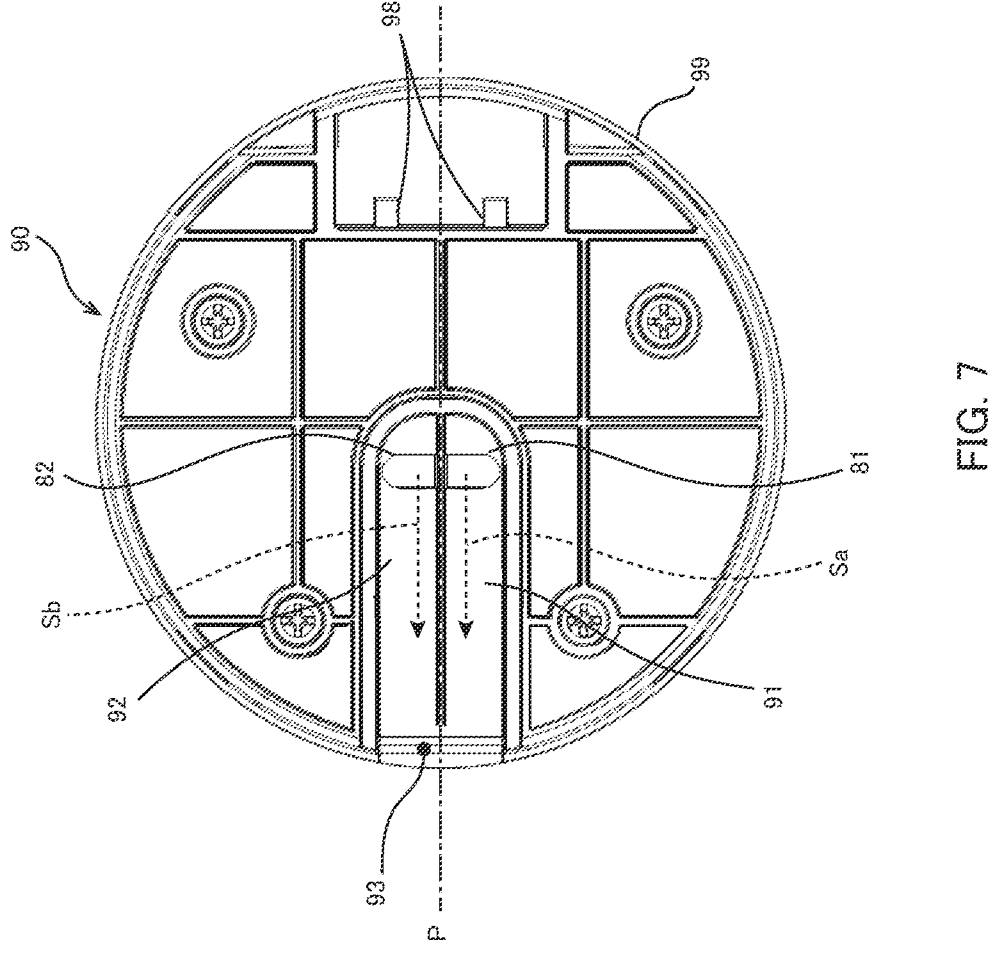
FIG. 7 is a top view of a middle lid shown in FIG. 3 and a second sealing plate.

As shown in FIG. 7, the middle lid 90 includes a middle lid main body 99 having a substantially disk-like shape, and a bracket 98 to be removably attached to the container 31. The discharge port 93, the first upper channel 91 and the second upper channel 92 are formed in the middle lid main body 99. The discharge port 93 is provided in the side face at the front of the middle lid main body 99. The first upper channel 91 is connected to the first passage port 81 at one end thereof and connected to the discharge port 93 at the other end thereof. The second upper channel 92 is connected to the second passage port 82 at one end thereof and connected to the discharge port 93 at the other end thereof. As shown in FIGS. 7, 8 and 9, in this embodiment, a part of the middle lid main body 99 is cut off straight from the front to the center thereof. The first upper channel 91, the second upper channel 92 and the discharge port 93 are defined by the bottom plate of the middle lid main body 99, a side edge face of the cut part of the middle lid main body 99 and the second sealing plate 110 stacked on the middle lid 90.

A user opens the lid body 40 on the kettle main body 30 and pours water into the kettle main body 30. The lid body 40 is closed, and the lock member 60 is engaged with the container 31. The kettle main body 30 is then attached to the power base 20 and energized. A heater provided in the container 31 heats the water stored in the container 31 until the temperature of the water reaches a set temperature. The user removes the kettle main body 30 from the power base 20, and then can power the hot water stored in the container 31 into a cup or the like by tilting the kettle main body 30 with the spout at the tip end of the nozzle 32 facing down.

As shown in FIGS. 5 to 7, when the water stored in the container 31 is being heated, steam produced in the container 31 is introduced into the lid body 40 through the first inlet port 53 and the second inlet port 54 provided on the back side of the lid body 40. Steam Sa introduced into the lid body 40 through the first inlet port 53 passes through the first lower channel 51, the first passage port 81 and the first upper channel 91 and then is discharged to the outside of the lid body 40 through the discharge port 93 provided at the front of the lid body 40. Similarly, steam Sb introduced into the lid body 40 through the second inlet port 54 provided on the back side of the lid body 40 passes through the second lower channel 52, the second passage port 82 and the second upper channel 92 and then is discharged to the outside of the lid body 40 through the discharge port 93 provided at the front of the lid body 40.

The handle 33 is provided on the rear side of the lid body 40, and the nozzle 32 extends from the container 31 on the front side of the lid body 40. Therefore, the user does not bring his/her face close to or put his/her hand above the front of the lid body 40. Thus, by providing the discharge port 93 on the front side of the lid body 40, the possibility is reduced that the user is burned or otherwise injured by the steam discharged from the discharge port 93 of the lid body 40. This contributes to the improvement of the safety of the electric kettle 10.

With the electric kettle 10 according to this embodiment, the nozzle 32 is attached to a lower part of the container 31, and therefore no steam is discharged from the nozzle 32 as far as a certain amount of water is stored in the container 31. As described above, two steam channels (first and second channels) are provided in the lid body 40. Therefore, the steam produced in the container 31 is discharged to the outside of the lid body 40 through the two steam channels described above. Even when the water boils and the amount of steam increases, a sufficient amount of discharge can be ensured and the pressure in the container 31 can be released since the two steam channels are provided.

Figure 10:
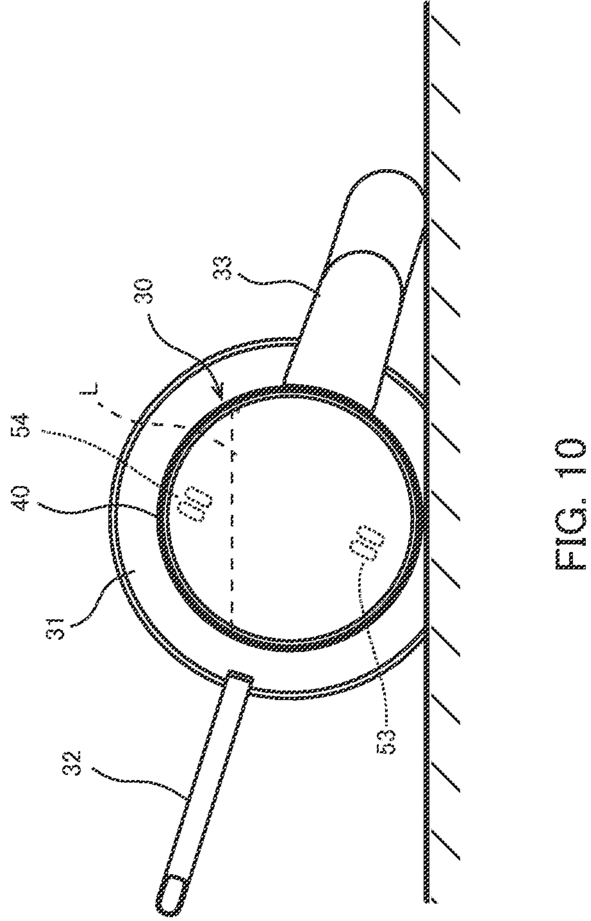
FIG. 10 is a diagram showing a fallen position of a kettle main body of the electric kettle shown in FIG. 1.
Figure 11:
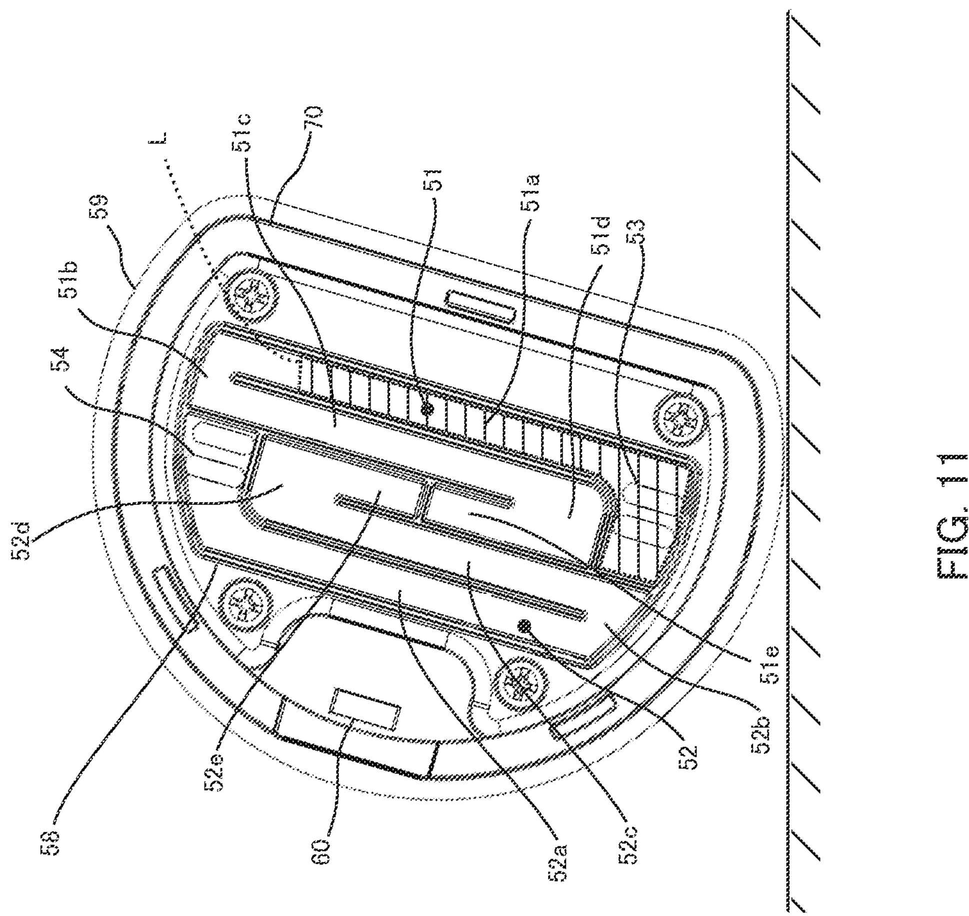
FIG. 11 is a diagram showing the interior of the lid body of the kettle main body in the position shown in FIG. 10.

With reference to FIGS. 10 to 13, a water leakage prevention function of the kettle main body 30 will be described. The water leakage prevention function mainly works when the kettle main body 30 falls down. FIG. 10 shows the kettle main body 30 fallen. FIG. 11 shows the interior of the lid body 40 of the kettle main body 30 fallen as shown in FIG. 10. Now, as an example, a case will be described where the kettle main body 30 falls down with the first inlet port 53 located below the second inlet port 54. The description equally holds to the case where the kettle main body 30 falls down in the opposite direction, except that the positions of the first inlet port 53 and the second inlet port 54 are transposed.

The nozzle 32 is provided at the front of the kettle main body 30, the handle 33 is provided at the rear of the kettle main body 30, and the center of gravity of the kettle main body 30 is located closer to the handle 33 at the rear than the central axis of the container 31. Therefore, as shown in FIG. 10, the kettle main body 30 falls down with the side of the handle 33 located lower than the side of the nozzle 32. In this position, the spout at the tip end of the nozzle 32 faces diagonally upward, and therefore, the water (hot water) contained in the kettle main body 30 does not leak from the spout at the tip end of the nozzle 32.

If the water level L in the container 31 is higher than the level of the first inlet port 53 and lower than the level of the second inlet port 54 when the kettle main body 30 falls down as shown in FIG. 10, the water stored in the container 31 flows into the lid body 40 through the first inlet port 53. However, as shown in FIG. 11, the partition plate 58 inside the first bent part 51*b* of the first lower channel 51 serves as a bank and prevents the water from flowing beyond the first bent part 51*b*. The water in the container 31 does not reach the discharge port 93. Immediately after the kettle main body 30 falls down, the water stored in the container 31 fluctuates, and a small amount of water may flow into the second channel part 51*c*. However, the second bent part 51*d* temporarily serves as a water storage part. The water flowing into the second channel part 51*c* is stored in the second bent part 51*d*, and does not flow beyond the second bent part 51*d* and reach the discharge port 93. In this way, since the first lower channel 51 is folded back twice in the opposite directions on the opposite sides of the front-rear centerline P, it is possible to flexibly address the fluctuation of the water in the container 31 immediately after the falling down of the kettle main body 30 and prevent the water from leaking from the discharge port 93.

Although the first lower channel 51 is folded back twice in the opposite directions on the opposite sides of the front-rear centerline P in this embodiment, the first lower channel 51 may be folded three or more times. Of course, even if the first lower channel 51 is folded back only once, it is hard for the water to flow beyond the first bent part 51*b*, so that the water can be prevented from leaking from the discharge port 93, or the amount of the water leaking from the discharge port 93 can be reduced.

Even after the kettle main body 30 is restored from the fallen position, the water having flowed into the first lower channel 51 of the lid body 40 when the kettle main body 30 fell may remain in the first lower channel 51. However, since the first channel has a two-layer structure, the water remaining in the first lower channel 51 does not flow into the first upper channel 91 even if the kettle main body 30 is tilted after the falling down. Therefore, no water leaks from the discharge port 93 when the kettle main body 30 is used after the falling down.

The steam in the container 31 is introduced into the lid body 40 through the second inlet port 54 and continuously discharged to the outside through the second lower channel 52, the second passage port 82, the second upper channel 92 and the discharge port 93. Therefore, the increase of the internal pressure of the container 31 because of the stream produced in the container 31 can be reduced, and water can be prevented from being ejected from the spout at the tip end of the nozzle 32.

In this embodiment, the two, first and second, channels provided in the lid body 40 have a two-layer structure and are serpentine in a first layer. In this way, a maximum channel length is ensured in a limited space. When the kettle main body 30 falls down in a condition that the temperature of the hot water in the container 31 is high and the internal pressure is high, the hot water in the container 31 rapidly flows into the first channel (second channel) in a short time until the pressure in the container 31 is released. By the first channel (second channel) having a large channel length as described above, the time required for the hot water in the container 31 to reach the discharge port 93 through the first channel can be increased. In this way, the hot water in the container 31 is prevented from leaking to the outside in a short time until the pressure in the container 31 is released, or the amount of the water leaking to the outside can be reduced.

Figure 12:
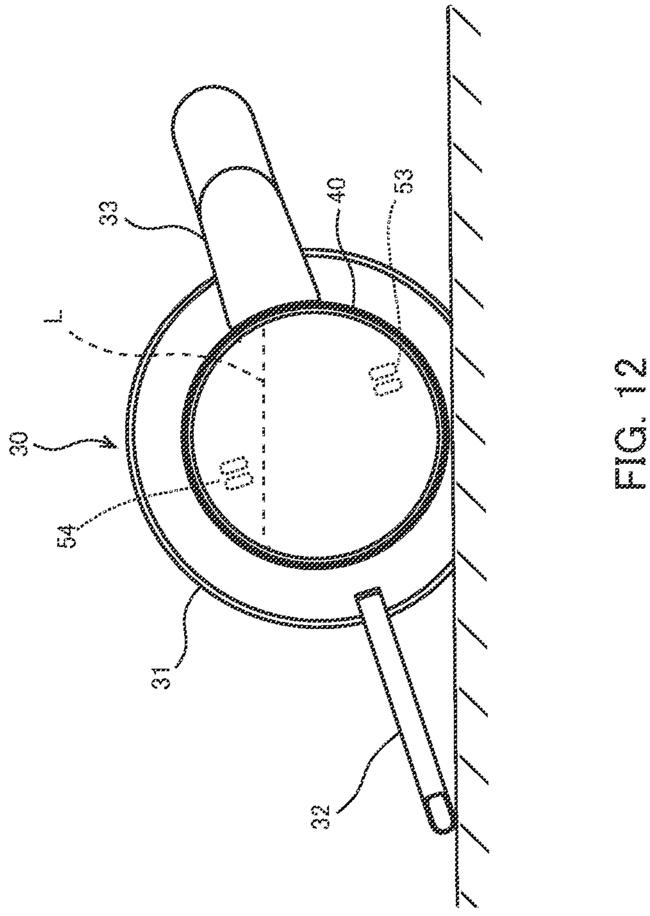
FIG. 12 is a diagram showing another fallen position of the kettle main body of the electric kettle shown in FIG. 1.

The kettle main body 30 may fall down with the side of the nozzle 32 located below the side of the handle 33 as shown in FIG. 12. However, the center of gravity of the kettle main body 30 is located closer to the handle 33 than the central axis of the container 31, and the container 31 has a generally cylindrical trapezoidal shape. Therefore, even if the kettle main body 30 falls down in the position shown in FIG. 12, the kettle main body 30 immediately rolls and stops in the position shown in FIG. 10. Therefore, the time for which the spout at the tip of the nozzle 32 is facing down is short, so that even if the kettle main body 30 falls down in the position shown in FIG. 12, the amount of the water leaking from the spout at the tip end of the nozzle 32 can be minimized.

As described above, with the electric kettle 10 according to this embodiment, the internal pressure of the kettle main body 30 can be released when the water is boiling, and even if the kettle main body 30 falls down, the amount of water (hot water) leaking from the spout at the tip end of the nozzle 32 or the discharge port 93 for steam can be minimized.

Although two channels are provided in the lid body 40 in this embodiment, three or more channels may be provided.

The present invention is not limited to the embodiment described above, and various modifications can be made in the implementation phase without departing from the spirit of the present invention. Embodiments may be combined as required, and in such a case, a combination of advantages can be attained. Furthermore, the embodiment described above includes various inventions, which can be derived by selectively combining any of the plurality of components disclosed. For example, when a problem can be solved or an advantage can be attained even if some of the components disclosed in the embodiment are omitted, the arrangement with those components omitted can be derived as an invention.

REFERENCE SIGNS LIST

10 . . . electric kettle, 20 . . . power base, 30 . . . kettle main body, 31 . . . container, 32 . . . nozzle, 33 . . . handle,

40 . . . lid body, 50 . . . inner lid, 51 . . . first lower channel, 52 . . . second lower channel, 51*a*, 52*a* . . . first channel part, 51*b*, 52*b* . . . first bent part, 51*c*, 52*c* . . . second channel part, 51*d*, 52*d* . . . second bent part, 51*e*, 52*e* . . . third channel part, 53 . . . first inlet port, 54 . . . second inlet port, 58 . . . partition plate, 59 . . . inner lid main body, 70 . . . rubber packing, 80 . . . first sealing plate, 81 . . . first passage port, 82 . . . second passage port, Sa, Sb . . . steam

The invention claimed is:

1. An electric kettle, comprising:

a container that contains water and is removably mounted on the power base;

a heater provided in the container and configured to heat the water to generate steam in the container;

a power base configured to supply electric power to the heater;

a nozzle having a base end provided in a lower part of a front of the container and a tip end extending upward; and a lid body having a plate-like shape that covers an opening of a top part of the container, wherein the lid body has:

a first inlet port and a second inlet port that are formed in a back side of the lid body and opening to the container, through which the steam generated in the container is introduced into the lid body;

a discharge port formed in a front side of the lid body and opening to an exterior of the lid body, through which the steam introduced into the lid body is discharged to the exterior of the lid body;

a first channel provided in the lid body and extending from the first inlet port to the discharge port, allowing the steam introduced through the first inlet port to flow through the first channel to the discharge port; and a second channel provided in the lid body and extending from the second inlet port to the discharge port, allowing the steam introduced through the second inlet port to flow through the second channel to the discharge port, and wherein:

the first inlet port and the second inlet port are disposed on opposite, left and right, sides of a front-rear centerline of the lid body;

the first channel extends from the first inlet port to the side of the second inlet port beyond the front-rear centerline and is folded back on the side of the second inlet port;

the second channel extends from the second inlet port to the side of the first inlet port beyond the front-rear centerline and is folded back on the side of the first inlet port;

the lid body is formed by a plurality of members including an upper layer-side member and a lower layer-side member that are stacked on one another in an up-down direction;

the first channel and the second channel are formed in both the upper layer-side member and the lower layer-side member;

a first passage port and a second passage port are provided at a center of the lid body;

the first passage port connects the lower layer-side member to the upper layer-side member through the first channel, allowing the steam to flow from the lower layer-side member to the upper layer-side member; and a second passage port connects the lower layer-side member to the upper layer-side member through the second channel, allowing the steam to flow from the lower layer-side member to the upper layer-side member.

2. The electric kettle according to claim 1, wherein a first lower channel, which is a part of the first channel from the first inlet port to the first passage port, and a second lower channel, which is a part of the second channel from the second inlet port to the second passage port, are inversely configured in a front-rear direction and a left-right direction.

3. The electric kettle according to claim 1, wherein the first channel extends from the first inlet port to the side of the second inlet port beyond the front-rear centerline, is folded back on the side of the second inlet port, extends beyond the front-rear centerline again to the side of the first inlet port, and is folded back on the side of the first inlet port, and the second channel extends from the second inlet port to the side of the first inlet port beyond the front-rear centerline, is folded back on the side of the first inlet port, extends beyond the front-rear centerline again to the side of the second inlet port, and is folded back on the side of the second inlet port.

4. The electric kettle according to claim 1, wherein the discharge port is provided at a front of the lid body.

5. The electric kettle according to claim 1, wherein the first channel and the second channel are each configured to have a height smaller than a width thereof.

6. The electric kettle according to claim 1, wherein a handle is provided at a rear of the container, and the container has a cylindrical shape or a cylindrical trapezoidal shape, and a center of gravity of a kettle main body is located further rearward than a central axis of the container, the kettle main body including the container, the nozzle, the handle and the lid body.

* * * * *